United States Patent Office 3,310,805
Patented Mar. 21, 1967

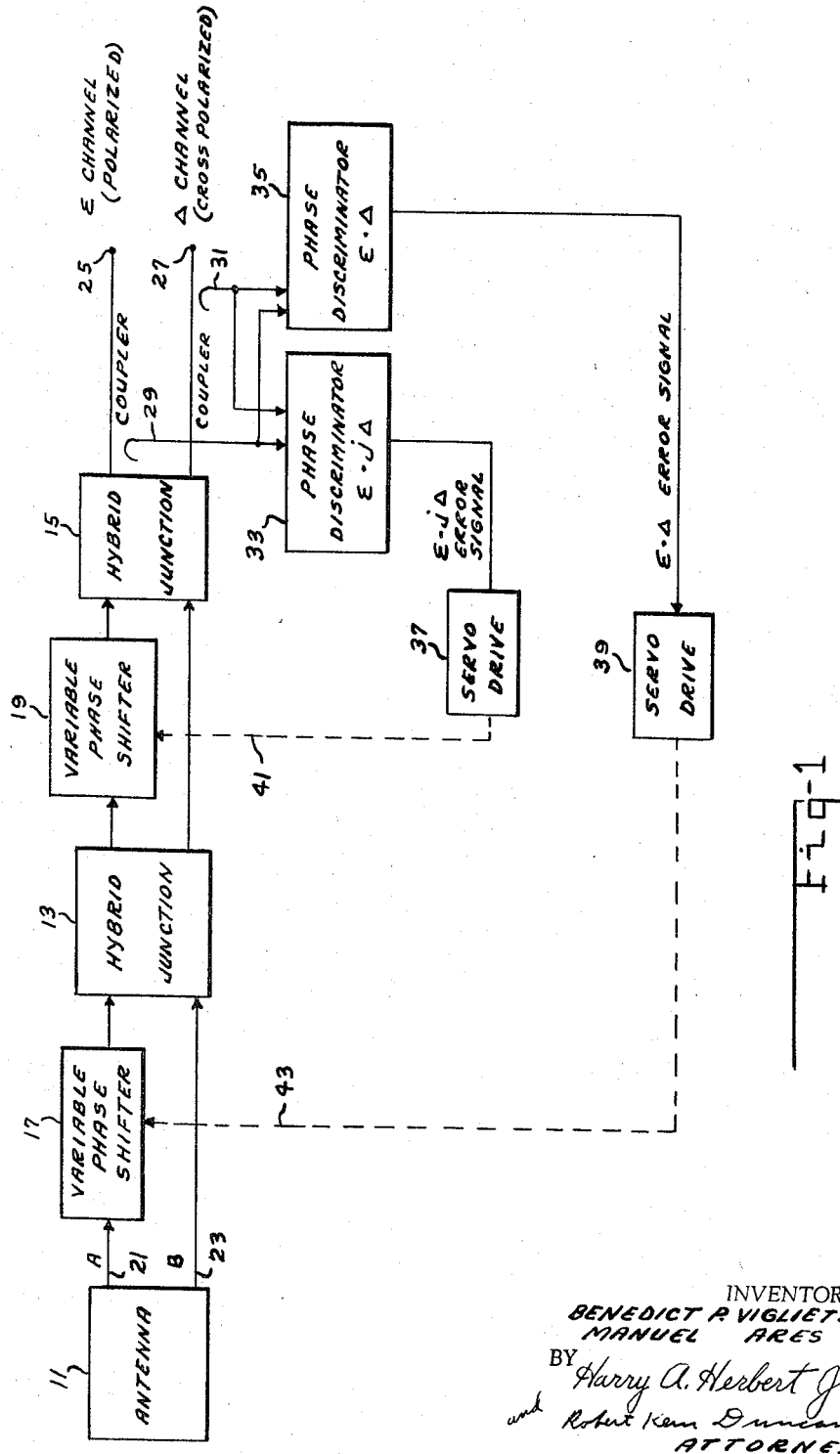

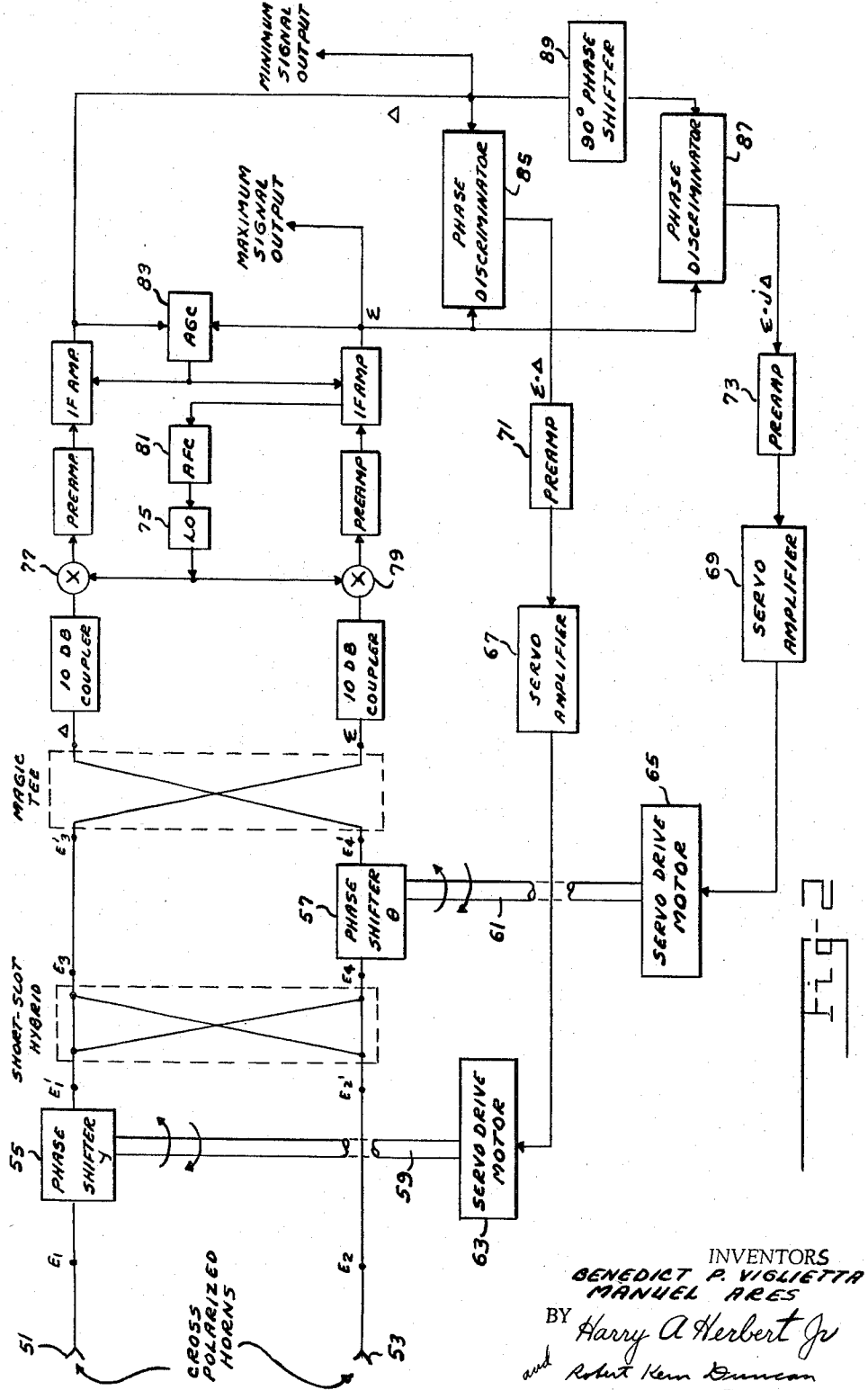

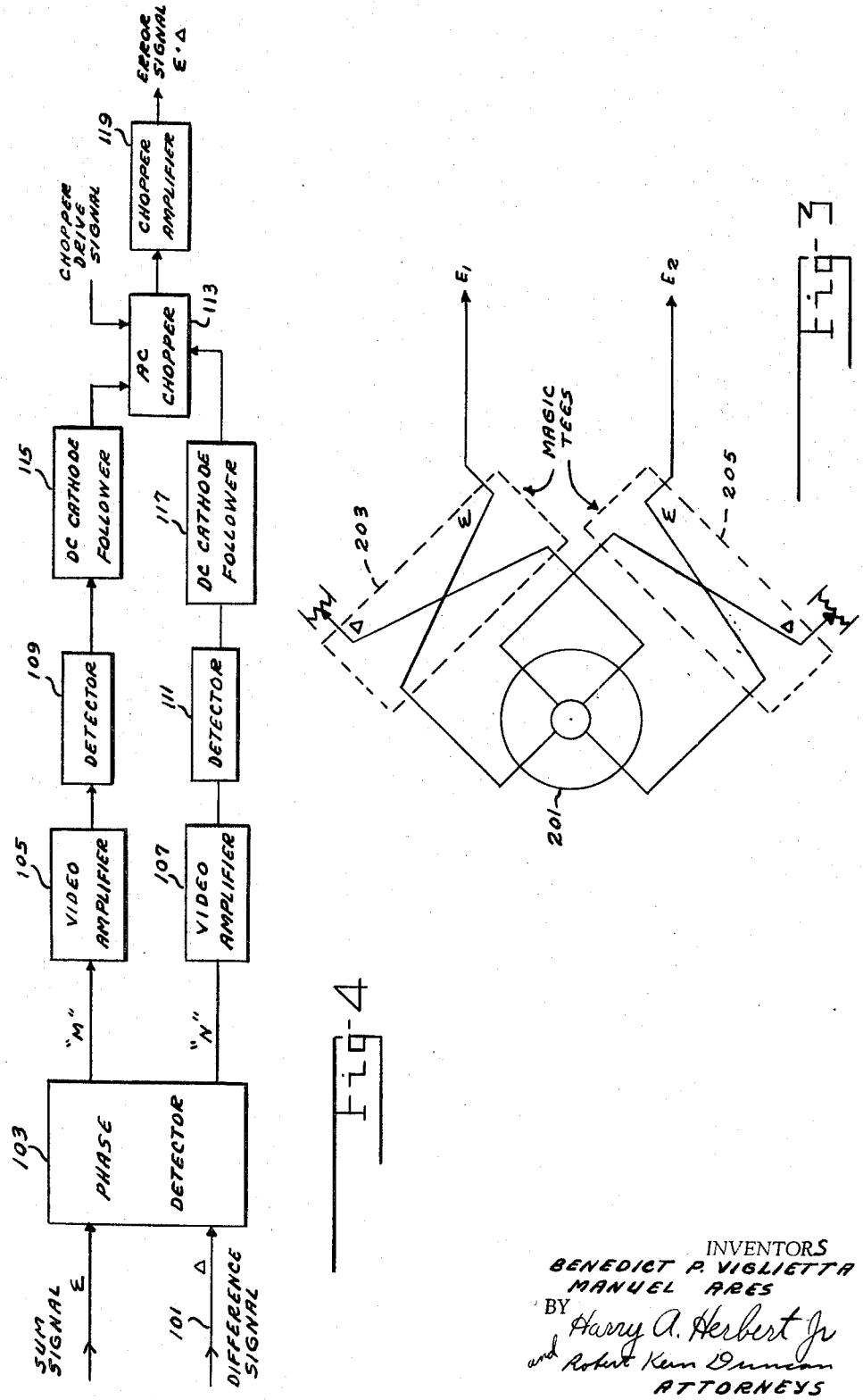

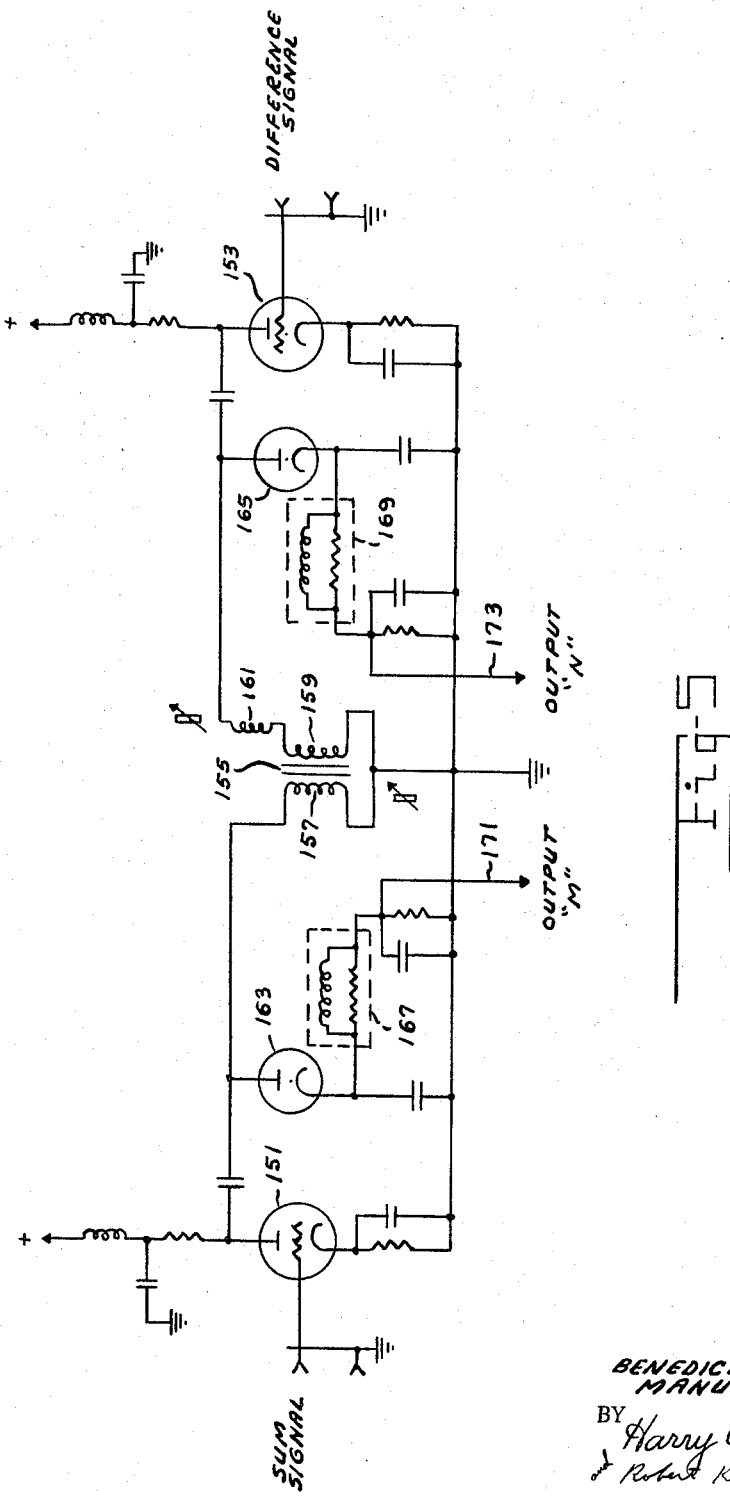

3,310,805
AUTOMATIC POLARIZATION TRACKER
Benedict P. Viglietta, Clinton, and Manuel Ares, Ithaca, N.Y., assignors to the United States of America as represented by the Secretary of the Air Force
Filed Oct. 19, 1964, Ser. No. 404,996
5 Claims. (Cl. 343—100)

This invention relates to an electromagnetic wave receiving system that will automatically track the changes in polarization of an electromagnetic wave. More specifically it relates to a two channel, phase controlled, electromagnetic wave receiving system in which the phase of the energy in each of the two channels of the received electromagnetic wave is controlled as a function of the polarization of the propagating wave.

This invention provides a receiving system that will adapt its effective polarization of reception continuously and automatically to an incoming wave of any arbitrary, changing polarization. The polarization of the wave is ascertained and a maximum signal output is provided by reason of the effective polarization of the system matching that of the incoming wave. A minimum signal or cross polarized output may also be obtained. This quadrature or minimum signal may also be termed a null signal. The foregoing determination of polarization may be accomplished by having two antennas covering the same region of space, cross polarized, with their outputs combined in phase shifting networks and summing (+ and −) networks providing a summation (polarized) signal and a difference (cross-polarized) signal. Automatic tracking loops actuate the phase shifting networks so as to maximize the summation signal and minimize the difference signal.

Prior to this time polarimetry has generally been limited to observing and recording the outputs of two orthogonally polarized antennas. Some work has been done with single conical horn antennas having a turnstile junction providing two orthogonal output signals, but a system that will automatically track polarization changes has not been heretofore available. Therefore, it is an object of the present invention to provide an electromagnetic wave receiving system that will automatically follow any changes in polarization of a propagating wave by continuously orienting its effective polarization of reception to that of the incoming wave.

Another object of the present invention is to provide an electromagnetic wave receiving system utilizing a stationary antenna system that will give a maximum output at all times to an incoming wave of changing polarization.

Another object of the present invention is to provide an electromagnetic wave receiving system that will maximize the ratio of a desired signal to an undesired signal.

Another object of the present invention is to provide an electromagnetic wave receiving system that will minimize undesired signals received in an antenna system.

Another object of the present invention is to provide an electronic system whereby a study of the electromagnetic wave polarization characteristics of reflecting objects may readily be made.

Another object of the present invention is to provide an electronic system for measuring the cross-polarization characteristics of radiating antenna systems.

Another object of the present invention is to provide a duplexing communication system on a single channel of operation.

These and additional objects of this invention will become known to those persons skilled in the art as the following description is comprehended in connection with the drawings, in which:

FIG. 1 is a simplified block diagram of an embodiment of the invention;

FIG. 2 is a detailed block diagram of another embodiment of the present invention;

FIG. 3 is a schematic diagram representation of a conical horn antenna system having orthogonal outputs;

FIG. 4 is a block diagram of a phase discriminator of the type that may be used in connection with the embodiment shown in FIG. 2;

FIG. 5 is a schematic diagram of a phase detector that may be used in the phase discriminator shown in FIG. 4.

Referring in detail to FIG. 1, the antenna 11 may be any arrangement that samples orthogonal polarization components of an incoming wave and develops RF voltages or Fields A and B, at outputs 21 and 23, proportional to these components. Some possibilities include vertical and horizontal dipoles, vertically and horizontally polarized horns, a single conical horn with a turnstile junction, and a dual mode horn with vertical and horizontal outputs or with right and left hand circular outputs. FIG. 3 shows a diagrammatic representation of a conical horn antenna 201 connected to two magic tees, 203 and 205, to provide quadrature outputs. The hybrid junctions 13 and 15 are devices that combine two inputs, say $x$ and $y$, and develop two outputs such as $$\frac{x+y}{\sqrt{2}} \text{ and } \frac{x-y}{\sqrt{2}}$$

or if the phase of the $-y$ signal is shifted in the junction by $j$ (90°)

$$\frac{x+jy}{\sqrt{2}} \text{ and } \frac{x-jy}{\sqrt{2}}$$

If the $x$ signal is shifted by $j$ (90°), and the $y$ signal shifted by $-j$ (270°), then the outputs become $$\frac{jx+y}{\sqrt{2}} \text{ and } \frac{x+jy}{\sqrt{2}}$$

The inherent phase shift in the junction is determined by the tape of junction used. Consider a phase shift device and a hybrid junction. It can be seen that the same output signal from the two devices will be obtained whether the junction provides no phase shift or adds a positive 90° phase shift and the variable phase shifting device is operated so as to effect a shift of the magnitude of the angle desired less 90°. Numerous types of hybrid junctions are available in the industry. Phase shifting devices are available that can effect phase shifts of any amount through angles to and greater than ±360 degrees. Phase shifters are available with a shaft for manual control of the amount of shift. Mechanical drive mechanism such as servo devices may be coupled to this shaft and the phase shift controlled by electrical signal parameters. Phase shift devices are available with a calibrated dial from which the degree of shift may readily be observed. Phase shift devices are also available to the industry that have ferrite active elements and may be controlled directly by an electrical signal rather than by a mechanical drive mechanism.

One of the feature of this invention is the fact that as long as the phase shift devices 17 and 19 are capable of shifting through $2\pi$ (±360 degrees), the hybrid junction devices may be any type of appropriate summing and difference taking devices—magic tee, short slot hybrid, etc.—that have fixed phase shift characteristics, and the system herein disclosed will automatically retain and track a polarity changing signal.

The outputs 25 and 27 of the second hybrid junction 15 will consist of a maximized or summation signal, that is, a signal which is peaked to a maximum value by the adjustments of the variabe phase shifters 17 and 19. This signal will appear at output 25. With the maximizing of the signal at 25 a miminal signal appears at output 27. The signal at 27 is in effect that signal which would appear from a receiving system whose reception characteristics are at quadrature or cross-polarized to the incoming wave. This minimum signal appears on the output of the difference arm of junction 15.

The signal outputs at 25 and 27 are available for further utilization apart from this invention. Such utilization might be instrumentation equipment for reading the maximum and minimum outputs such as amplifiers, detectors, voltmeters, oscilloscopes, recording equipment, and communication equipment. Couplers 29 and 31 are used to extract the sum and difference signals from the respective signal lines for driving the phase discriminators 33 and 35. Phase discriminator 33 performs that dot product of the summation signal with the quadrature of the difference signal. Discriminator 35 performs the dot product of the summation signal and the difference signal. These discriminators will be further described later. These product outputs from the discriminators constitute error signals that are used to control the phase shift devices 17 and 19. In this particular embodiment the error signals actuate servo drive mechanisms 37 and 39 that may be mechanically coupled through linkages 41 and 43 to the phase shift devices 17 and 19. Manual or automatic slewing means may be coupled to the mechanical drives 41 and 43 for signal acquisition. As previously stated, the phase shift devices 17 and 19 may have calibrated dials attached to their phase controlling input shafts from which the amounts of phase shift effected by the system in tracking the signal may be ascertained and the polarity characteristics of the incoming signal determined. Polarization characteristics may also be obtained by coupling electronic integrators, calibrated in terms of signal polarization, to the error signal outputs of the discriminators.

The method by which the system accomplishes the foregoing can be understood by considering that the system operates to make the Δ channel signal a minimum and the Σ channel a maximum. The phase discriminator 35 produces an error signal proportion to Σ·Δ, that is to say it produces a signal that is proportional to the Δ signal components that are in phase with the Σ signal. Likewise, the other discriminator 33 produces an error signal proportional to the Δ signal components in quadrature with the Σ signal. The error signals, through the servo drive means, drive the phase shifters in a direction so as to reduce the error signals until the error signals are both zero. At this point, the Δ signal is zero and the Δ channel is cross polarized to the incoming wave. Also, the Σ channel is at a maximum signal strength since this channel is properly polarized to the incoming wave.

The block diagram shown in FIG. 1 is in simplified form. No doubt, in many systems additional amplification will be required either at RF or IF between the couplers and the phase discriminators, or at video after the phase discriminators. The requirement for additional amplification will be determined by the strength of the incoming signal in the particular application in which the system is to be used. The phase shifters positions will unambiguously indicate the polarization of the incoming wave.

The system has the novel application to a duplex communication system wherein a signal to be transmitted is appropriately injected in the difference channel at 27 and radiated by the anntena system 11, polarized in a manner quadrature to the polarization of reception. This manner of operation is possible since the components are linear bilateral elements. Thus, two systems may communicate on one frequency, each transmitting and receiving at quadrature to the other.

FIG. 2 is a block diagram in considerably more detail than FIG. 1 and specific components of the mentioned types of components are enumerated. The mathematical analysis of this operating embodiment will be given, but first a closer look at specific components that may be employed. Cross polarized antenna horns 51 and 53 may be standard rectangular microwave horns, positioned with their axes of polarization at right angles to each other. Phase shifters 55 and 57 may be mechanically actuated, operable over 360 degrees of resulting phase shift, controlled by the mechanical rotation of shaft inputs 59 and 61. Servo drive motors 63 and 65, servo amplifiers 67 and 69, and preamplifiers 71 and 73 are conventional pieces of electronic equipment. Typical tachometer feedback control may be utilized with each servo. These techniques and components are well known to persons skilled in the electronic art.

Local oscillator 75 beats with the incoming signals to produce the intermediate frequency signals in the mixer stages 77 and 79. In typical microwave transmission and reception the IF frequency might be 30 mc. Automatic frequency control 81 and automatic gain control 83 may be included in the system as shown. The receiving techniques of heterodyning, and of frequency and gain control, are also well known in the electronic art.

One phase discriminator 85 (shown in detail in FIGS. 4 and 5), produces a signal to control the γ phase shifter 55. Its output is proportional to the sum signal and the quadrature component of the difference signal. Phase discriminator 87 produces a signal to control the θ phase shifter. Its output is proportional to the sum signal and the in-phase component of the difference signal. The foregoing at first appears erroneous, but is not, since in this embodiment the phase detector used in the phase discriminator is sensitive only to two quadrature signals. This fact also explains the use of the 90° phase shifter 89.

Phase discriminators 85 and 87 may be identical. A block diagram is shown in FIG. 4 typical of the discriminator 85 of FIG. 2. Discriminator 87 would be the same except that input 101 would be jΔ. The sum and difference signals are coupled to the phase detector 103. This detector (as further detailed), responds to the sum signal and only to the quadrature component of the difference signal. The output of the detector 103 consists of two signals, one to channel M and onto channel N. The channel M signal consists of the detected sum signal, plus or minus a reflected different signal also detected (reflected in the sense that the signal is reflected through a 90 degree phase advance through electromagnetic coupling). The channel N signal consists of the detected difference signal plus or minus a reflected sum signal also detected. Channels M and N preferably are identical channels. It may be necessary in order to preserve reasonable signal levels, to utilize video amplifiers 105 and 107. In one operating embodiment these amplifiers are typical three-stage video amplifiers. After the amplification, the signals are further detected by detectors 109 and 111. In some applications of this invention it may be desirable to gate these detectors on in time relationship to a separately emitted pulse of electromagnetic radiation energy; in the study of the polarization of echoes, for instance. The outputs from detectors 109 and 111 are essentially D.C. potentials. These D.C. potentials are coupled to the A.C. chopper 113 by means of cathode followers 115 and 117. In the A.C. chopper the channel M signal is compared with the channel N signal and the difference between them is amplified by chopper amplifier 119. The output of amplifier 119 is thus a D.C. potential, plus or minus, that represents the dot product of Σ and Δ. It is used to drive the servo amplifier which in turn controls the γ phase shifter. Chopper amplifier 119 of FIG. 4 may be combined with the preamplifier 71 of FIG. 2. The other phase discriminator 87 operates in the same manner as the one just described.

Phase detector 103 of the discriminator of FIG. 4 may be constructed as shown in schematic form in FIG. 5. FIG. 5 may also apply to the phase detector used in the other discriminator. The sum signal is coupled to the grid of vacuum tube 151, and the difference signal is coupled to the grid of vacuum tube 153. The gain of each tube is made the same and preferably close to unity. In so doing, thus splitting the load almost equally between the plate and the cathode, neutralization is not required. The plate outputs from each tube 151 and 153 are coupled to transformer 155. Both windings of the transformer are tuned to resonate with the capacitance of the tubes and the wiring at the operating frequency; that is, the IF frequency (typically 30 mc.). One side of the transformer, winding 157, may be slug-tuned, and the other side, winding 159, tuned by varying the slug in inductor 161. The transformer should be transitionally tuned, that is, the curve of the secondary output voltage versus frequency should be flat over a relatively wide frequency range centered about the operating frequency. The operation of this transformer is to produce a signal in the opposite winding, from which the original signal is introduced, that is shifted ahead 90 degrees in phase. Thus, the sum signal appears at the output of winding 159 shifted ahead in phase 90 degrees and the difference signal appears across winding 157 shifted ahead in phase by 90 degrees. The two signals in each winding add together, i.e., the sum signal and the reflected difference signal in winding 157; and in winding 159, the two signals (the difference signal and the reflected sum signal), add together. The sum of the signals on winding 157 is detected by diode 163 and the sum of the signals on winding 159 is detected by diode 165. Filters 167 and 169 remove any IF signal components remaining after detection. Outputs M and N on conductors 171 and 173 are the same as those shown in the block diagram circuitry of FIG. 4.

The structure and the principles of operation of the invention have been set forth. The mathematical analysis of the embodiment shown in FIG. 2 may be set forth in the following manner.

Consider that the inputs $E_1$ and $E_2$ are the horizontal and vertical components of an elliptically polarized wave represented by the phasors:

$$E_1 = A e^{-j\beta}$$

and $$E_2 = B$$

The signal at $E_1$ is phase-shifted by an amount $\gamma$ so that the input to the short-slot hybrid is:

$$E_1' = A e^{-j(\beta-\gamma)} = A e^{j\phi}$$

where $$\phi = \gamma - \beta \text{ and } E_2' = B$$

The short-slot hybrid is described by the scattering matrix:

$$S_H = \frac{1}{\sqrt{2}} \begin{bmatrix} 0 & 0 & 1 & j \\ 0 & 0 & j & 1 \\ 1 & j & 0 & 0 \\ j & 1 & 0 & 0 \end{bmatrix}$$

so that at the output of the hybrid $$E_3 = \frac{A}{\sqrt{2}} e^{j\phi} + j\frac{B}{\sqrt{2}}$$

$$E_4 = j\frac{A}{\sqrt{2}} e^{j\phi} + \frac{B}{\sqrt{2}}$$

Now $E_4$ undergoes a phase shift, $\theta$ (in phase shifter 57), so that the inputs to the magic T are:

$$E_3' = E_3$$

$$E_4' = j\frac{A}{\sqrt{2}} e^{j(\phi+\theta)} + \frac{B}{\sqrt{2}} e^{j\theta}$$

The scattering matrix of the T is:

$$S_T = \frac{1}{\sqrt{2}} \begin{bmatrix} 0 & 0 & 1 & 1 \\ 0 & 0 & -1 & 1 \\ 1 & -1 & 0 & 0 \\ 1 & 1 & 0 & 0 \end{bmatrix}$$

so that the respective outputs are:

$$\Delta = \frac{A}{2} e^{j\phi}(1-je^{j\theta}) + \frac{B}{2}(j-e^{j\theta})$$

$$\Sigma = \frac{A}{2} e^{j\phi}(1+je^{j\theta}) + \frac{B}{2}(j+e^{j\theta})$$

Expansion by substitution of $$e^{j\theta} = \cos\theta + j\sin\theta$$
$$e^{j\phi} = \cos\phi + j\sin\phi$$

gives $$\Delta = \frac{A}{2}[\cos\phi(1+\sin\theta) + \sin\phi\cos\theta] - \frac{B}{2}\cos\theta +$$

$$j\left\{\frac{A}{2}[\sin\phi(1+\sin\theta) - \cos\theta\cos\phi] + \frac{B}{2}(1-\sin\theta)\right\}$$

$$\Sigma = \frac{A}{2}[\cos\phi(1-\sin\theta) - \sin\phi\cos\theta] + \frac{B}{2}\cos\theta +$$

$$j\left\{\frac{A}{2}[\sin\phi(1-\sin\theta) + \cos\theta\cos\phi] + \frac{B}{2}(1+\sin\theta)\right\}$$

The first phase discriminator performs the operation:

$$\Sigma \cdot \Delta = |\Sigma| \, |\Delta| \cos\omega$$

where $\omega$ is the phase difference between $\Sigma$ and $\Delta$. Performance of the dot product gives:

$$\Sigma \cdot \Delta = 2AB \sin\phi = 2AB \sin(\gamma - \beta)$$

In a similar manner, the second phase discriminator performs the operation $$\Sigma \cdot j\Delta$$

this yields $$\Sigma \cdot j\Delta = (A^2 - B^2)\cos\theta + 2AB\cos\phi\sin\theta$$

These signals, $\Sigma \cdot \Delta$ and $\Sigma \cdot j\Delta$, represent the signals which are used to drive the phase shifter servos. It is important to note that the signal $\Sigma \cdot \Delta$ is suitable for driving the $\gamma$ phase shifter since it is zero when $\gamma = \beta$. Furthermore, $\Sigma \cdot \Delta$ is independent of the value of $\theta$ which facilitates the lock-on procedure. The $\theta$ phase shifter drive is obtained from $\Sigma \cdot j\Delta$ which, assuming that the $\gamma$ phase shifter has been adjusted so that $\gamma$ is approximately equal to $\beta$ ($\phi \approx 0$), is reasonably independent of small changes in $\phi$ and takes the form $$\Sigma \cdot j\Delta = (A^2 - B^2)\cos\theta + 2AB\sin\theta$$

which is zero when $$\theta = \tan^{-1} \frac{A^2 - B^2}{2AB}$$

For A and B approximately equal, the approximation $\Sigma \cdot j\Delta \approx 2AB\theta$ is valid. Therefore, the error voltage is a linear function of the phase shifter when the magnitudes of the incoming components are approximately equal. If it is desired that the error voltages be essentially linear functions of the phase variations, it would be advisable to arrange the receiving antennas so that for the majority of the situations to be encountered A and B will be approximately equal. For tracking purposes it is not essential that the error signals be linear representations for the system to follow the polarization changes in the incoming wave. The accuracy of tracking (sensitivity) may vary slightly over the eliptical angle as the ratio of the values of A and B depart from unity.

Many modifications and variations of the present invention will be made in the practice of the teachings contained herein. It is, therefore, to be understood that within the scope of the appended claims the invention may be practiced otherwise than as specifically described.

We claim:

1. An automatic polarization tracking system for automatically following changes in polarization of propagating electromagnetic radiation energy comprising: electromagnetic energy receiving means having a first signal output and a second signal output; a first phase shifting means for varying the phase relation of one of said output signals providing a first phase varied signal; additive means for providing a first summation signal proportional to the sum of the signals of said first phase varied signal and other signal output of said receiving means; additive means for providing a first difference signal proportional to the difference in the signal of said first phase varied signal and the other signal output of said receiving means; a second phase shifting means for varying the phase of the signal from one of said additive means providing a second phase varied signal; means for providing a second summation signal proportional to the sum of the signal from the second phase shifting means and the other signal from said additive means; means for providing a second difference signal proportional to the difference of the signals from the second phase shifting means and the other signal from said additive means; means for determining the product of said second summation signal and said second difference signal providing a first error signal; means for determining the product of said second summation signal and the quadrature of said second difference signal providing a second error signal; means cooperating with said first error signal and said first phase shifting means whereby the phase shift effected in said phase shifting means is a function of said first error signal; and means cooperating with said second error signal and said second phase shifting means whereby the phase shift effected in said phase shifting means is a function of said second error signal.

2. An automatic polarization tracking system for automatically following changes in polarization of propagating electromagnetic radiation energy comprising: electromagnetic energy receiving means having a first signal output and a second signal output; a first phase shifting means for varying the phase relation of said first output signals providing a first phase varied signal; means for providing a first summation signal proportional to the sum of the signals of said first phase varied signal and said second signal output of said receiving means; means for providing a first difference signal proportional to the difference in the signal of said first phase varied signal and said second signal output of said receiving means; a second phase shifting means for varying the phase of said first summation signal providing a second phase varied signal; means for providing a second summation signal proportional to the sum of the signal from the second phase shifting means and the said first difference signal; means for providing a second difference signal proportional to the difference of the signals from the second phase shifting means and the said first diffenrec signal; means for determining the product of said second summation signal and said second difference signal providing a first error signal; means for determining the product of said second summation signal and the quadrature of said second difference signal providing a second error signal; means cooperating with said first error signal and said first phase shifting means whereby the phase shift is a function of said first error signal; and means cooperating with said second error signal and said second phase shifting means whereby the phase shift is a function of the said second error signal.

3. An automatic, microwave, polarization tracking system comprising: a first microwave horn receiving antenna having an output signal responsive to propagating electromagnetic energy; a second microwave horn receiving antenna in orthogonal polarization relationship to said first horn receiving antenna having an output signal responsive to propagating electromagnetic energy; a first controllable phase shifting means cooperating with output of said first microwave horn having a phase controlled output signal; a short-slot hybrid microwave junction cooperating with the output of said first phase shifting means and with the output of said second microwave horn receiving antenna providing a hybrid first output signal proportional to the sum of the output signal of said phase shifting means and the quadrature of the output signal of said second horn receiving antenna, and a hybrid second output signal proportional to the sum of the quadrature of the output signal of said phase shifting means and the output signal of said second horn receiving antenna; a second controllable phase shifting means cooperating with said hybrid second output signal, having a phase controlled output signal; a magic tee junction cooperating with said hybrid first output signal and the output signal of said second controllable phase shifting means, providing a summation output signal and a difference output signal; intermediate frequency producing means cooperating with said summation signal and said difference signal providing an intermediate frequency summation signal and an intermediate frequency difference signal; a first phase discriminator means providing an output signal proportional to the product of said intermediate frequency summation signal and said intermediate frequency difference signal; quadrature phase shifting means cooperating with said intermediate frequency difference signal providing a quadrature output signal proportional to said difference signal shifted ninety degrees in phase; a second phase discriminator means providing an output signal proportional to the product of said intermediate frequency summation signal and said quadrature output signal from said ninety degree phase shifter; connecting means cooperating with the output signal of said first phase discriminator and said first controllable phase shifting means whereby the phase shift effected by said controllable phase shifting means is responsive to the said output signal of the first discriminator; and connecting means cooperating with the output signal of said second phase discriminator and said second controllable phase shifting means whereby the phase shift effected by said controllable means is responsive to the said output signal of the second discriminator.

4. An automatic, electromagnetic wave, polarization tracking system comprising: a first polarized receiving antenna means having an output signal responsive to said electromagnetic wave; a second polarized receiving antenna means in orthogonal polarization relationship to said first polarized receiving antenna means, having an output signal responsive to said electromagnetic wave; a first controllable phase shifting means cooperating with output of said first receiving antenna means having a phase controlled output signal; a short-slot hybrid junction cooperating with the output of said first phase shifting means and with the output of said second receiving antenna means providing a hybrid first output signal proportional to the sum of the output signal of said first phase shifting means and the quadrature of the output signal of said second receiving antenna means, and a hybrid second output signal equivalent to the sum of the quadrature of the output signal of said first phase shifting means and the output signal of said second receiving antenna means; a second controllable phase shifting means cooperating with said hybrid second output signal, having a phase controlled output signal; a magic tee junction cooperating with said hybrid first output signal and the output signal of said second controllable phase shifting means, providing a summation output signal and a difference output signal; means for providing a first error signal proportional to the product of said summation signal and said difference signal; quadrature phase shifting means cooperating with said difference signal providing a quadrature output signal proportional to said difference signal shifted ninety degrees in phase; means providing a second error signal proportional to the product of said summation signal and said quadrature output signal from said ninety degree phase shifter; connecting means cooperating with said first error signal and said first controllable phase shifting means whereby the phase shift effected by said controllable means is responsive to the said first error signal; and connecting means cooperating with the said second error signal and said second controllable phase shifting means whereby the phase shift effected by said controllable means is responsive to the said second error signal.

5. An automatic, electromagnetic wave, polarization tracking system comprising: a first polarized receiving antenna means having an output signal responsive to said electromagnetic wave; a second polarized receiving antenna means in orthogonal polarization relationship to said first polarized receiving antenna means, having an output signal responsive to said electromagnetic wave; a first controllable phase shifting means cooperating with output of said first receiving antenna means having a phase controlled output signal; a short-slot hybrid junction cooperating with the output of said first phase shifting means and with the output of said second receiving antenna means providing a hybrid first output signal proportional to the sum of the output signal of said first phase shifting means and the quadrature of the output signal of said second receiving antenna means, and a hybrid second output signal equivalent to the sum of the quadrature of the output signal of said first phase shifting means and the output signal of said second receiving antenna means; a second controllable phase shifting means cooperating with said hybrid second output signal, having a phase controlled output signal; a magic tee junction cooperating with said hybrid first output signal and the output signal of said second controllable phase shifting means, providing a summation output signal and a difference output signal; means for providing a first error signal proportional to the product of said summation signal and the quadrature component of said difference signal; quadrature phase shifting means cooperating with said difference signal providing a quadrature output signal proportional to said difference signal shifted ninety degrees on phase; means for providing a second error signal proportional to the product of said summation signal and the quadrature component of said quadrature output signal from said ninety degree phase shifter; connecting means cooperating with said first error signal and said first controllable phase shifting means whereby the phase shift effected by said controllable means is responsive to the said first error signal; and connecting means cooperating with the said second error signal and said second controllable phase shifting means whereby the phase shift effected by said controllable means is responsive to the said second error signal.

References Cited by the Examiner

UNITED STATES PATENTS

| | | | |
|---|---|---|---|
| 2,991,471 | 7/1961 | Pritchard | 343—100 |
| 3,137,853 | 6/1964 | Cutler | 343—100.3 |
| 3,209,355 | 9/1965 | Livingston | 343—100.3 |
| 3,246,331 | 4/1966 | Royal | 343—100.3 |

CHESTER L. JUSTUS, *Primary Examiner.*

RODNEY D. BENNETT, *Examiner.*

C. E. WANDS, *Assistant Examiner.*